US012417688B2

(12) United States Patent
Alexander et al.

(10) Patent No.: US 12,417,688 B2
(45) Date of Patent: Sep. 16, 2025

(54) SINGLE-WAVE MULTI-ANGLE SMOKE ALARM ALGORITHM

(71) Applicant: Carrier Corporation, Palm Beach Gardens, FL (US)

(72) Inventors: Jennifer Alexander, Minneapolis, MN (US); Peter Harris, Jupiter, FL (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 77 days.

(21) Appl. No.: 18/354,424

(22) Filed: Jul. 18, 2023

(65) Prior Publication Data

US 2024/0046767 A1 Feb. 8, 2024

Related U.S. Application Data

(60) Provisional application No. 63/396,000, filed on Aug. 8, 2022.

(51) Int. Cl.
*G08B 17/107* (2006.01)

(52) U.S. Cl.
CPC .................................. *G08B 17/107* (2013.01)

(58) Field of Classification Search
CPC .................................................... G08B 17/107
USPC .......................................................... 340/630
See application file for complete search history.

(56) References Cited

U.S. PATENT DOCUMENTS 5,352,901 A 10/1994 Poorman
5,841,534 A 11/1998 Lorenz
6,218,950 B1 4/2001 Politze et al.
7,760,102 B2 7/2010 Chabanis et al.
7,777,634 B2 8/2010 Kaelin et al.
8,638,436 B2 1/2014 Dohi
8,773,272 B2 7/2014 Nagashima
9,036,150 B2 * 5/2015 Wedler .................. G01N 21/53 356/338
9,541,501 B2 1/2017 Allemann et al.
10,685,546 B2 6/2020 Duric et al.
(Continued)

FOREIGN PATENT DOCUMENTS

CA 2462003 A1 9/2005
CN 108205867 A 6/2018
(Continued)

OTHER PUBLICATIONS

Search Report issued in European Patent Application No. 23187876.0; Application Filing Date Jul. 26, 2023; Date of Mailing Feb. 5, 2024 (12 pages).

*Primary Examiner* — Kam Wan Ma
(74) *Attorney, Agent, or Firm* — CANTOR COLBURN LLP

(57) ABSTRACT

A smoke detector is provided and includes a housing defining a chamber for receiving ambient materials, a single receiver, first and second emitters configured to emit light into the chamber to be respectively scattered from the ambient materials toward the single receiver with back scatter and forward scatter effects, respectively, and a controller. The single receiver generates first and second output signals in accordance with the light respectively scattered toward the single receiver with the back and forward scatter effects, respectively. The controller is receptive of the first and second output signals and determines whether a condition is appropriate to trigger an alarm.

16 Claims, 3 Drawing Sheets

(56) References Cited

U.S. PATENT DOCUMENTS

| | | | | |
|---|---|---|---|---|
| 2019/0266868 | A1* | 8/2019 | Patel | G08B 17/107 |
| 2021/0123863 | A1 | 4/2021 | Gadonniex | |
| 2021/0166542 | A1 | 6/2021 | Patel | |

FOREIGN PATENT DOCUMENTS

| | | | |
|---|---|---|---|
| CN | 210777050 | U | 6/2020 |
| CN | 112885025 | A | 6/2021 |
| EP | 1619640 | A1 | 1/2006 |
| EP | 2214146 | A1 | 8/2010 |
| JP | 2001236575 | A | 8/2001 |

* cited by examiner

SINGLE-WAVE MULTI-ANGLE SMOKE ALARM ALGORITHM

CROSS-REFERENCE TO RELATED APPLICATIONS

This application claims the benefit of U.S. Provisional Application No. 63/396,000 filed Aug. 8, 2022, the disclosure of which is incorporated herein by reference in its entirety.

BACKGROUND

The following description relates to smoke alarms and, more specifically, to a single-wave multi-angle smoke alarm and a single-wave multi-angle smoke alarm algorithm.

A smoke detector is a device that detects smoke and issues an alarm, whether locally or via an ancillary device. A photo-electric smoke detector is a type of smoke detector that works based on light scattering principles.

Conventional photo-electric smoke detectors include one light emitter, one light receiver and an optic chamber with the emitter and receiver being in a forward light scattering configuration. When there is no smoke in the optic chamber, and the optic chamber is empty or mostly empty, the light receiver typically receives a small amount of light scattered from the chamber surfaces. On the other hand, when smoke is present in the optic chamber, the light receiver receives more light due to the light being scattered from the smoke particles. When an amount of light received by the receiver exceeds a certain threshold, an alarm is triggered.

Conventional photo-electric smoke detectors are able to detect real-world fires that present hazards to life and property, such as wood fires and other flammable materials fires. However conventional photo-electric smoke detectors can also alarm on events deemed non-hazardous such as cooking events, dust and steam. Typically, conventional photo-electric smoke detectors produce false alarms because they are not able to discriminate between non-smoke and smoke particles. Smoke events and non-hazardous events such as cooking and steam produce particles with different optical properties which conventional photo-electric smoke detectors cannot distinguish.

Modern homes have materials that burn much faster than older homes and so smoke alarms used in modern homes must be much more sensitive to these types of fires. However, false alarms caused by cooking and steam from showers are often an annoyance as described above and can cause people to remove the batteries from their smoke alarms and thus leave them unprotected from a real fire.

Advanced algorithms for smoke detectors are needed in order to alarm early for fast flaming fires but also reduce the amount of nuisance alarms.

BRIEF DESCRIPTION

According to an aspect of the disclosure, a smoke detector is provided and includes a housing defining a chamber for receiving ambient materials, a single receiver, first and second emitters configured to emit light into the chamber to be respectively scattered from the ambient materials toward the single receiver with back scatter and forward scatter effects, respectively, and a controller. The single receiver generates first and second output signals in accordance with the light respectively scattered toward the single receiver with the back and forward scatter effects, respectively. The controller is receptive of the first and second output signals and determines, based on a ratio thereof, whether a condition in the chamber is appropriate to trigger an alarm.

In accordance with additional or alternative embodiments, the single receiver includes a photodiode and the first and second emitters comprise light emitting diodes (LEDs).

In accordance with additional or alternative embodiments, the controller is configured to determine whether the condition is a fire and to trigger the alarm accordingly.

In accordance with additional or alternative embodiments, the ambient materials include air and smoke and non-smoke particles carried by the air.

In accordance with additional or alternative embodiments, the controller is configured to determine whether to trigger the alarm based on one or more of the ratio of the first and second output signals, timing dynamics data and failsafe data.

According to an aspect of the disclosure, a smoke detector is provided and includes a housing defining a chamber for receiving ambient materials, receivers, an emitter configured to emit light into the chamber to be respectively scattered from the ambient materials toward the receivers and a controller. An angular distance between the emitter and the receivers is less than 90° and greater than 90°, respectively. The angular distance of less than 90° generates a back scatter effect and the angular distance of greater than 90° generates a forward scatter effect. The receivers generate first and second output signals in accordance with the light respectively scattered toward the receivers with the back and forward scatter effects, respectively. The controller is receptive of the first and second output signals and determines, based on a ratio thereof, whether a condition in the chamber is appropriate to trigger an alarm.

According to an aspect of the disclosure, a method of operating a smoke detector is provided. The smoke detector includes a housing defining a chamber for receiving ambient materials, a single receiver and first and second emitters configured to emit light into the chamber to be respectively scattered from the ambient materials toward the single receiver with back scatter and forward scatter effects, respectively. The method includes generating first and second output signals in accordance with the light respectively scattered toward the single receiver with the back and forward scatter effects, respectively, and determining, based on a ratio of the first and second output signals, whether a condition in the chamber is appropriate to trigger an alarm.

In accordance with additional or alternative embodiments, the determining includes determining whether the condition is a fire and to trigger the alarm accordingly.

In accordance with additional or alternative embodiments, the ambient materials include air and smoke and non-smoke particles carried by the air.

In accordance with additional or alternative embodiments, the determining includes determining whether to trigger the alarm based on the ratio of the first and second output signals and one of timing dynamics data and failsafe data.

In accordance with additional or alternative embodiments, the determining includes determining whether to trigger the alarm based on the ratio of the first and second output signals, timing dynamics data and failsafe data.

According to an aspect of the disclosure, a method of operating a smoke detector is provided. The smoke detector includes a housing defining a chamber for receiving ambient materials, a single receiver and first and second emitters configured to emit light into the chamber to be respectively scattered from the ambient materials toward the single receiver with back scatter and forward scatter effects, respectively. The method includes generating first and second output signals in accordance with the light respectively scattered toward the single receiver with the back and forward scatter effects, respectively, discriminating between ambient materials indicative of a fire and ambient materials indicative of a nuisance based on timing dynamics and determining, from a result of the discriminating, whether a condition is appropriate to trigger an alarm.

In accordance with additional or alternative embodiments, the determining includes determining whether the condition is a fire and to trigger the alarm accordingly.

In accordance with additional or alternative embodiments, the ambient materials include air and smoke and non-smoke particles carried by the air.

In accordance with additional or alternative embodiments, the determining includes determining whether to trigger the alarm based on the ratio of the first and second output signals and one of timing dynamics data and failsafe data.

In accordance with additional or alternative embodiments, the determining comprises determining whether to trigger the alarm based on the ratio of the first and second output signals, timing dynamics data and failsafe data.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

Figure 1:
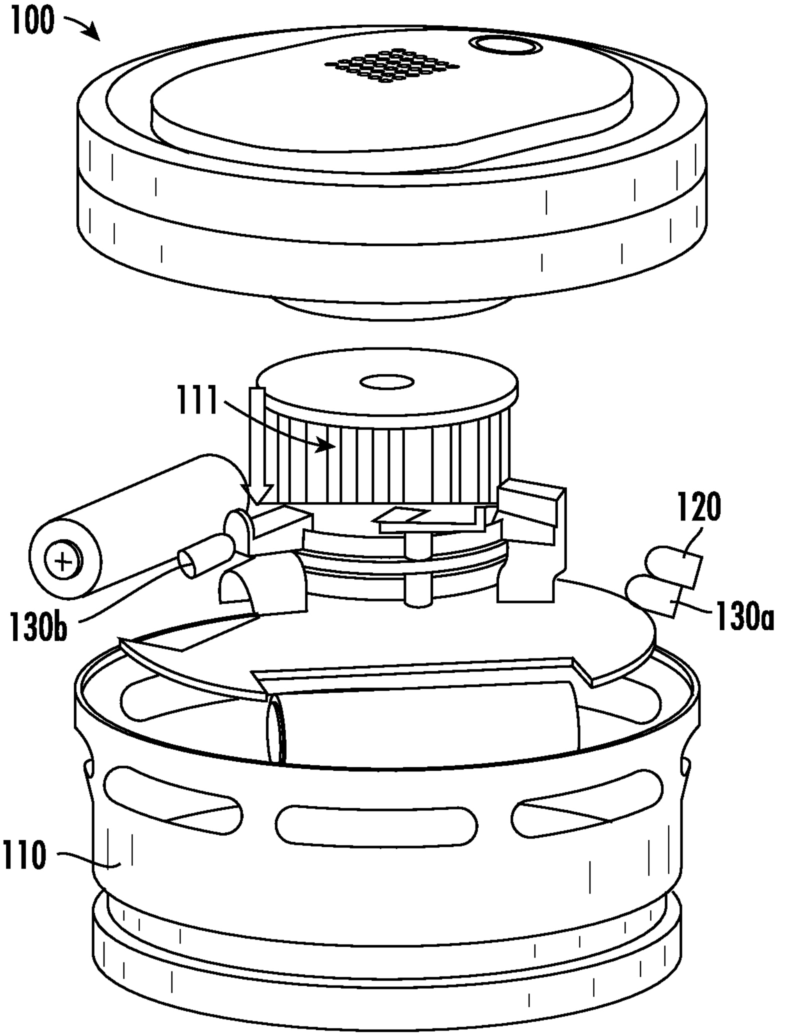
FIG. 1 is an exploded view of a smoke detector in accordance with exemplary embodiments.

These and other advantages and features will become more apparent from the following description taken in conjunction with the drawings.

DETAILED DESCRIPTION

Legacy smoke alarms typically use a single IR forward channel with a single threshold. The single threshold can cause missed or late alarms to flaming fires or cause a lot of false alarms. While many new alarms can use multi-wave and multi-angle technology, which is much better for detecting flaming fires and nuisances, the new alarms can be expensive to manufacture and calibrate.

As will be described below, a smoke detector is provided that uses advanced timing dynamics and a ratio of two signals in order to alarm early on fast flaming fires and in order to delay/reduce false alarms. The two signals in the ratio are IR forward and IR backward angle signals. The ratio discriminates between fast flaming fires from nuisances.

Certain residential and commercial standards require smoke detectors be configured to not sound an alarm until after a certain threshold (1.5% obs/ft.) during the "broiling hamburger" test, but before a certain threshold (5% obs/ft.) during the "flaming foam fire" test. To meet these requirements, smoke detectors have been previously designed to include multiple emitters configured to emit multiple kinds of light at various angles to one or more receivers, generating a combination of infrared forward scatter, infrared back scatter and blue forward scatter. These detectors are sometimes referred to as "multi-wave, multi-angle smoke detectors". To reduce the cost and complexity of the smoke detector while maintaining the ability of meeting requirements, a photo-electric smoke detector with a single photodiode and multiple light emitting diodes (LEDs) is configured with an angular distance between the single photodiode and the multiple LEDs of less than 90° and greater than 90° is provided.

These angular distances can be measured from emitting axes extending from the multiple LEDs to a receiving axis extending from the single photodiode. However, if the single photodiode and either of the multiple LEDs were switched, the angular distance can be measured, from a receiving axis extending from the single photodiode to emitting axes extending from the multiple LEDs.

The angular distances between the single photodiode and the multiple LEDs generate a forward scatter effect and a back scatter effect. By generating both the forward scatter effect and the back scatter effect, the smoke detector reduces the detection of particles produced during the "broiling hamburger" test but does not eliminate it altogether. This is because the particles produced during the "broiling hamburger" test generate a strong forward scatter signal, which is picked up by the forward scatter effect, and a weak back scatter signal, which is not picked up by the back scatter effect. By reducing the detection of the particles produced during the "broiling hamburger" test, more accurate readings of the particles produced during the "flaming foam fire" test and other real-world hazardous fires are possible. At the same time, by continuing to detect the particles, the smoke detector can use the detection to delay or reduce false alarms.

A type of light emitted by the multiple LEDs can be infrared (IR) light or any light in the visible spectrum, such as blue light.

Figure 2:
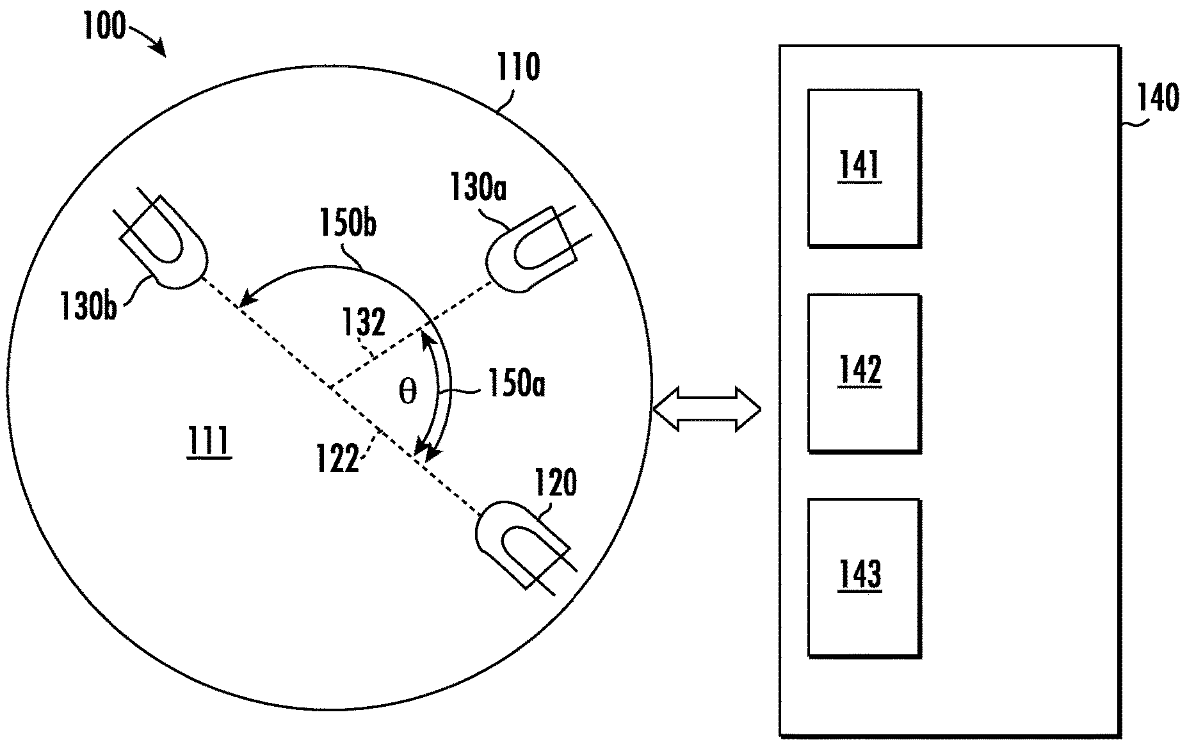
FIG. 2 is a perspective view of a smoke detector in accordance with exemplary embodiments.

With reference to FIGS. 1 and 2, a smoke detector 100 can be configured to detect smoke and/or other constituents capable of entering the smoke detector 100, such as carbon monoxide. When used to detect smoke, the smoke detector 100 is capable of detecting when ambient materials, such as air and smoke and non-smoke particles carried by the air, enter the smoke detector 100. The smoke detector 100 can be a photo-electric smoke detector.

As shown in FIGS. 1 and 2, which are not drawn to scale, the smoke detector 100 includes a housing 110 defining a chamber 111 for receiving ambient materials, a single receiver, such as a single photodiode 120, which is configured to receive light from the chamber 111, multiple emitters, such as a first LED **130*a* and a second LED 130*b*, which are configured to emit light toward the ambient materials in the chamber 111 so that the light reflects off of the ambient materials toward the single photodiode 120. The single photodiode 120 in turn generates first and second output signals that are received by a controller 140 (see FIG. 2). The controller 140 is configured to receive the first and second output signals from the single photodiode 120 and to determine whether a current condition of the chamber 111 indicates a need to trigger an alarm. The first and second output signals sent to the controller 140 by the single photodiode 120 can be indicative of an intensity of the light the single photodiode 120** receives.

In accordance with embodiments, two receivers and one emitter can be used in the smoke detector to measure the forward and back scatter signals. The controller 140 will operate in these instances similarly as described above and below.

The chamber 111 is generally open to the surroundings of the smoke detector 100 so that the ambient materials can enter the chamber 111 through a grating or other similar feature. The single photodiode 120 may be any suitable photo-electric light receiving element capable of receiving light scattered from the ambient materials in the chamber 111. The first LED 130*a* and the second LED 130*b* may be any suitable light emitting device capable of emitting light, such as infrared (IR) LED or any LED in the visible spectrum, such as blue light, into the chamber 111. The single photodiode 120 can be secured by a housing 121. The first LED 130*a* and the second LED 130*b* can be secured by a housing 131.

In accordance with embodiments, the smoke detector 100 includes only one single photodiode 120 and the first LED 130*a* and the second LED 130*b* at the same wavelength and is thus configured as a single-wave multi-angle smoke detector 100. In accordance with alternative embodiments, the smoke detector 100 can also include two or more photodiodes 120, only one of the first LED 130*a* and the second LED 130*b* and/or two or more of either of the first LED 130*a* and the second LED 130*b*. The present description will relate to the embodiments in which the smoke detector 100 includes only one single photodiode 120 and the first LED 130*a* and the second LED 130*b* at the same wavelength. This is being done for clarity and brevity and is not intended to otherwise limit the scope of the application as a whole or the claims which include a claim to an embodiment with receivers and an emitter.

The controller 140 may be provided on a printed circuit board (PCB) which mechanically supports and communicatively connects components using conductive tracks, pads, or other features etched from one or more layers of copper onto and/or between one or more non-conductive sheets. In other instances, the controller 140 may not be on a PCB, but instead may be on any suitable substrate capable of supporting the components of the controller 140.

With reference to FIG. 2, the controller 140 may include an emitter controlling component 141 operatively coupled with each of the first LED 130*a* and the second LED 130*b* for controlling the operations of each of the first LED 130*a* and the second LED 130*b*, an alarm processing component 142 communicatively coupled with the single photodiode 120 to receive the first and second output signals from the single photodiode 120 and to complete the determination of whether or not to trigger an alarm, and a photodiode controlling component 143 operatively coupled with the single photodiode 120 for controlling the operation of the single photodiode 120.

Controller 140, through the alarm processing component 142, determines whether to trigger an alarm based on whether the current condition indicates a fire. The alarm processing component 142 of the controller 140 makes this determination, at least in part, based on the intensity of the light the single photodiode 120 receives.

As shown in FIG. 2, the angular distance 150*a* between the single photodiode 120 and the first LED 130*a* is less than 90° whereas the angular distance 150*b* between the single photodiode 120 and the second LED 130*b* is greater than 90°. The angular distances 150*a* and 150*b* in the configuration shown in FIG. 2 are measured, in a clockwise fashion, from receiving axis 122.

The angular distance 150*a* between the single photodiode 120 and the first LED 130*a* generates a back scatter effect and the angular distance 150*b* between the single photodiode 120 and the second LED 130*b* generates a forward scatter effect. When detecting the particles, the single photodiode 120 generates the first and second output signals which are sent to the controller 140. The controller 140 is configured to determine whether a current condition of the chamber 111 indicates a need to trigger an alarm by monitoring ratios between the first and second output signals in concert with other data (i.e., timing dynamics data and failsafe data).

The controller 140 can trigger an alarm at different output signal thresholds depending on the timing dynamics of one or more of the output signal.

The components of the smoke detector 100 and methods by which the smoke detector is operated, enables the differentiation between fast fires or slow fires, making the smoke detector 100 compliant with various standards.

Figure 3:
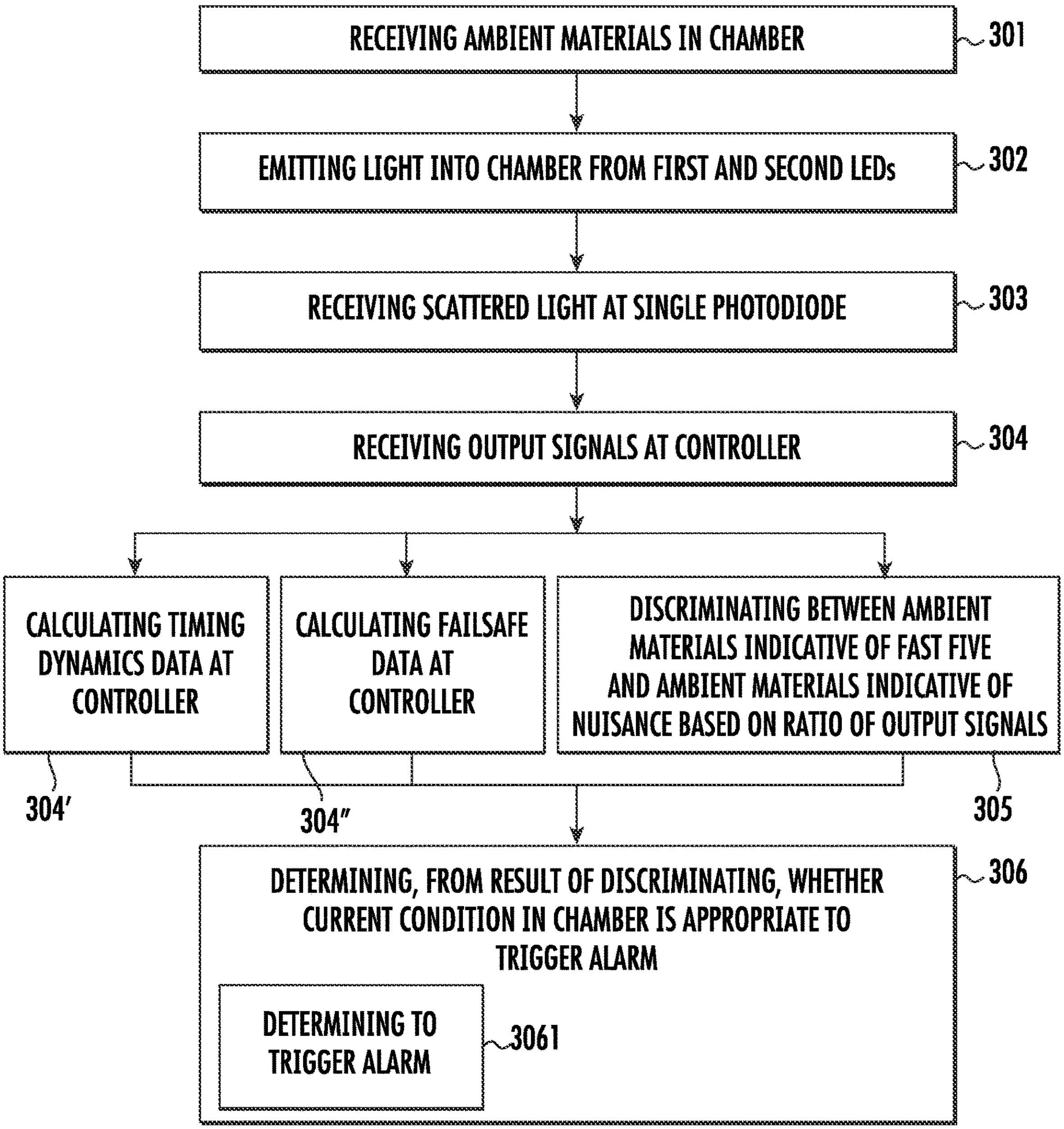
FIG. 3 is a flow diagram illustrating a method of operating a smoke detector in accordance with exemplary embodiments.

With reference to FIG. 3, a method of operating a smoke detector, such as the smoke detector 100 of FIGS. 1 and 2, is provided. As shown in FIG. 3, the method includes receiving ambient materials, such as air and smoke and non-smoke particles carried by the air, in a chamber (block 301), emitting light into the chamber from first and second LEDs (block 302), receiving light scattered from the ambient materials in the chamber at a single photodiode and generating first and second output signals by the single photodiode, an angular distance between the first and second LEDs and the single photodiode being less than 90° and greater than 90°, respectively, wherein the angular distance of less than 90° generates a back scatter effect and the angular distance of greater than 90° generates a forward scatter effect (block 303) and receiving, at a controller, the first and second output signals (block 304). The method further includes discriminating between ambient materials indicative of a fire based on a ratio of the first and second output signals (block 305) and determining, from a result of the discriminating, whether a current condition in the chamber is appropriate to trigger an alarm (block 306).

In accordance with embodiments, the determining of block 306 includes determining whether the current condition is a fire and to trigger the alarm accordingly (block 3061).

In accordance with embodiments, the receiving of the first and second output signals of block 304 can further include calculating timing dynamics data (block 304') and failsafe data (block 304"). In these or other cases, the determining of block 3061 can include determining whether to trigger the alarm based on one or both of the timing dynamics data and the failsafe data and optionally in concert with the ratio of the first and second output signals.

Technical effects and benefits of the present disclosure are the provision of a smoke detector that is able to detect fast flaming fires quickly and reduces or delays false alarms. The smoke detector can be assembled or manufactured quickly at low costs.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A smoke detector, comprising:

a housing defining a chamber for receiving ambient materials;

a single receiver;

first and second emitters configured to emit light into the chamber to be respectively scattered from the ambient materials toward the single receiver, first and second angular distances between the first and second emitters and the single receiver being less than 90° and greater than 90°, respectively, wherein the first angular distance of less than 90° generates a back scatter effect and the second angular distance of greater than 90° generates a forward scatter effect;

a controller, wherein:

the first and second angular distances are measured clockwise about a common point from a receiving axis of the single receiver, the common point being defined at an intersection of the receiving axis and respective emitting axes of the first and second emitters, the single receiver generates first and second output signals in accordance with the light respectively scattered toward the single receiver with the back and forward scatter effects, respectively, and the controller is receptive of the first and second output signals and determines, based at least on a ratio thereof, whether a condition in the chamber is appropriate to trigger an alarm.

2. The smoke detector according to claim 1, wherein the single receiver comprises a photodiode and the first and second emitters comprise light emitting diodes (LEDs).

3. The smoke detector according to claim 1, wherein the controller is configured to determine whether the condition is a fire and to trigger the alarm accordingly.

4. The smoke detector according to claim 1, wherein the ambient materials comprise air and smoke and non-smoke particles carried by the air.

5. The smoke detector according to claim 1, wherein the controller is configured to determine whether to trigger the alarm based on one or more of the ratio of the first and second output signals, timing dynamics data and failsafe data.

6. A smoke detector, comprising:

a housing defining a chamber for receiving ambient materials;

receivers;

an emitter configured to emit light into the chamber to be respectively scattered from the ambient materials toward the receivers, first and second angular distances between the emitter and the receivers being less than 90° and greater than 90°, respectively, wherein the first angular distance of less than 90° generates a back scatter effect and the second angular distance of greater than 90° generates a forward scatter effect;

a controller, wherein:

the first and second angular distances are measured clockwise about a common point from an emitting axis of the emitter, the common point being defined at an intersection of the emitting axis and respective receiving axes of the receivers, the receivers generate first and second output signals in accordance with the light respectively scattered toward the receivers with the back and forward scatter effects, respectively, and the controller is receptive of the first and second output signals and determines, based on a ratio thereof, whether a condition in the chamber is appropriate to trigger an alarm.

7. A method of operating a smoke detector, the smoke detector comprising a housing defining a chamber for receiving ambient materials, a single receiver and first and second emitters configured to emit light into the chamber to be respectively scattered from the ambient materials toward the single receiver with back scatter and forward scatter effects, respectively, the method comprising:

arranging the single receiver and the first and second emitters such that first and second angular distances between the first and second emitters and the single receiver are less than 90° and greater than 90°, respectively, wherein the first angular distance of less than 90° generates the back scatter effect and the second angular distance of greater than 90° generates the forward scatter effect, wherein the first and second angular distances are measured clockwise about a common point from a receiving axis of the single receiver and the common point is defined at an intersection of the receiving axis and respective emitting axes of the first and second emitters;

generating first and second output signals in accordance with the light respectively scattered toward the single receiver with the back and forward scatter effects, respectively; and determining, based on a ratio of the first and second output signals, whether a condition in the chamber is appropriate to trigger an alarm.

8. The method according to claim 7, wherein the determining comprises determining whether the condition is a fire and to trigger the alarm accordingly.

9. The method according to claim 7, wherein the ambient materials comprise air and smoke and non-smoke particles carried by the air.

10. The method according to claim 7, wherein the determining comprises determining whether to trigger the alarm based on the ratio of the first and second output signals and one of timing dynamics data and failsafe data.

11. The method according to claim 7, wherein the determining comprises determining whether to trigger the alarm based on the ratio of the first and second output signals, timing dynamics data and failsafe data.

12. A method of operating a smoke detector, the smoke detector comprising a housing defining a chamber for receiving ambient materials, a single receiver and first and second emitters configured to emit light into the chamber to be respectively scattered from the ambient materials toward the single receiver with back scatter and forward scatter effects, respectively, the method comprising:

arranging the single receiver and the first and second emitters such that first and second angular distances between the first and second emitters and the single receiver are less than 90° and greater than 90°, respectively, wherein the first angular distance of less than 90° generates the back scatter effect and the second angular distance of greater than 90° generates the forward scatter effect, wherein the first and second angular distances are measured clockwise about a common point from a receiving axis of the single receiver and the common point is defined at an intersection of the receiving axis and respective emitting axes of the first and second emitters generating first and second output signals in accordance with the light respectively scattered toward the single receiver with the back and forward scatter effects, respectively;

discriminating between ambient materials indicative of a fire and ambient materials indicative of a nuisance based on timing dynamics; and determining, from a result of the discriminating, whether a condition is appropriate to trigger an alarm.

13. The method according to claim 12, wherein the determining comprises determining whether the condition is a fire and to trigger the alarm accordingly.

14. The method according to claim 12, wherein the ambient materials comprise air and smoke and non-smoke particles carried by the air.

15. The method according to claim 12, wherein the determining comprises determining whether to trigger the alarm based on the timing dynamics of one or more output signals and one of a ratio of the first and second output signals and failsafe data.

16. The method according to claim 12, wherein the determining comprises determining whether to trigger the alarm based on a ratio of the first and second output signals of the first and second output signals, timing dynamics data and failsafe data.

* * * * *